(12) United States Patent
Jones

(10) Patent No.: US 6,510,383 B1
(45) Date of Patent: Jan. 21, 2003

(54) VEHICULAR ROUTE OPTIMIZATION SYSTEM AND METHOD

(75) Inventor: Martin Kelly Jones, Vancouver (CA)

(73) Assignee: ArrivalStar, Inc., Delray Beach, FL (US)

(*) Notice: Subject to any disclaimer, the term of this patent is extended or adjusted under 35 U.S.C. 154(b) by 0 days.

(21) Appl. No.: 09/516,127

(22) Filed: Mar. 1, 2000

(51) Int. Cl.[7] .................. G08G 1/123; G06F 15/24; G06F 17/60
(52) U.S. Cl. .................. 701/209; 701/200; 340/993; 705/5
(58) Field of Search .................. 701/209, 200, 701/207, 204, 213, 117, 202, 210; 340/993, 994, 988, 989, 991; 342/357.07, 457; 705/5, 6; 455/457

(56) References Cited

U.S. PATENT DOCUMENTS 3,644,883 A    2/1972   Borman et al. .............. 340/23

(List continued on next page.)

FOREIGN PATENT DOCUMENTS

| FR | 2 559 930 | 8/1985 | ............ G08G/1/12 |
| FR | 2674355 | 9/1992 | |
| JP | 52066175 | 6/1977 | |
| JP | 63288400 | 11/1988 | ............ G08G/1/12 |

*Primary Examiner*—Tan Nguyen
*Assistant Examiner*—Dalena Tran

(57) ABSTRACT

A vehicular route optimization system and method changes the order that a vehicle is expected to arrive at a plurality of destinations based on requests from users so that the vehicle arrives at the plurality of destinations at more opportune times for the users. The system includes memory, a first communications device, and a data manager. The memory stores data indicating an order that a mobile vehicle is expected to arrive at the plurality of destinations. The first communications device receives a request transmitted from a remote communications device, and the data manager, in response to the request, defines a new order that the mobile vehicle is expected to arrive at the plurality of destinations. The data manager also identifies one of the destinations and a particular time period based on the request and determines whether the vehicle is expected to arrive at the one destination during the particular time period, if the vehicle travels a route based on the new order. If the vehicle is expected to arrive at the one destination during the particular time period when the vehicle travels the route based on the new order, the data manager updates the data such that the data indicates the new order. The updated data can then be displayed to a driver of the vehicle, who follows the route based on the new order. Therefore, the vehicle should arrive at the one destination during the particular time period.

38 Claims, 5 Drawing Sheets

U.S. PATENT DOCUMENTS

| | | | |
|---|---|---|---|
| 3,845,289 A | 10/1974 | French | 235/151.2 |
| 3,934,125 A | 1/1976 | Macano | 235/150.2 |
| 4,325,057 A | 4/1982 | Bishop | 340/539 |
| 4,713,661 A | 12/1987 | Boone et al. | 340/994 |
| 4,791,571 A | 12/1988 | Takahashi et al. | 364/436 |
| 4,799,162 A | 1/1989 | Shinkawa et al. | 364/436 |
| 4,804,937 A * | 2/1989 | Barbiaux et al. | 340/52 |
| 4,812,843 A | 3/1989 | Champion, III et al. | 340/905 |
| 4,956,777 A | 9/1990 | Cearley et al. | 364/424.02 |
| 5,014,206 A * | 5/1991 | Scribner et al. | 364/449 |
| 5,068,656 A * | 11/1991 | Sutherland | 340/989 |
| 5,113,185 A | 5/1992 | Ichikawa | 340/995 |
| 5,121,325 A * | 6/1992 | DeJonge | 364/442 |
| 5,121,326 A | 6/1992 | Moroto et al. | 364/449 |
| 5,122,959 A | 6/1992 | Nathanson et al. | 364/436 |
| 5,131,020 A | 7/1992 | Liebesny et al. | 379/59 |
| 5,168,451 A | 12/1992 | Bolger | 364/436 |
| 5,253,165 A * | 10/1993 | Leiseca et al. | 364/407 |
| 5,299,132 A | 3/1994 | Wortham | 364/460 |
| 5,394,332 A | 2/1995 | Kuwahara et al. | 364/449 |
| 5,400,020 A | 3/1995 | Jones | 340/994 |
| 5,444,444 A | 8/1995 | Ross | 340/994 |
| 5,448,479 A | 9/1995 | Kemner et al. | 365/424.02 |
| 5,461,374 A | 10/1995 | Lewiner et al. | 340/994 |
| 5,493,295 A | 2/1996 | Lewiner et al. | 340/994 |
| 5,519,621 A | 5/1996 | Wortham | 364/460 |
| 5,539,810 A | 7/1996 | Kennedy, III et al. | 379/59 |
| 5,544,225 A | 8/1996 | Kennedy, III et al. | 379/59 |
| 5,579,376 A | 11/1996 | Kennedy, III et al. | 379/60 |
| 5,594,650 A | 1/1997 | Shah et al. | 364/449.1 |
| 5,623,260 A | 4/1997 | Jones | 340/994 |
| 5,648,770 A | 7/1997 | Ross | 340/994 |
| 5,652,707 A | 7/1997 | Wortham | 364/460 |
| 5,657,010 A | 8/1997 | Jones | 340/994 |
| 5,668,543 A | 9/1997 | Jones | 340/994 |
| 5,736,940 A | 4/1998 | Burgener | 340/994 |
| 5,751,245 A * | 5/1998 | Janky et al. | 342/357 |
| 5,760,742 A | 6/1998 | Branch et al. | 342/457 |
| 5,771,455 A | 6/1998 | Kennedy, III et al. | 455/456 |
| RE35,920 E | 10/1998 | Sorden et al. | 342/457 |
| 5,987,377 A * | 11/1999 | Westerlage et al. | 701/204 |
| 6,006,159 A | 12/1999 | Schmier et al. | 701/200 |
| 6,134,501 A * | 10/2000 | Oumi | 701/209 |
| 6,249,767 B1 * | 6/2001 | Okayama et al. | 705/5 |

* cited by examiner

42

| ITEM IDENTIFIER | ADDRESS | ETA |
|---|---|---|
| 9789304 | 2223 Belmount Rd | 9:15 a.m. |
| 4508923 | 4672 Tree Top Rd | 9:25 a.m. |
| 3253798 | 7639 1st St | 9:40 a.m. |
| 9856702 | 2675 Alford Ave | 10:00 a.m. |
| 2315690 | 3498 2nd Ave | 10:15 a.m. |
| 9830492 | 9803 10th St | 10:35 a.m. |
| 7852095 | 8723 Park Place | 10:45 a.m. |
| 1480453 | 8736 Stockton St | 11:05 a.m. |
| 4790678 | 3243 5th Ave | 11:30 a.m. |
| 4231786 | 8563 Church St | 1:15 p.m. |
| 9004786 | 7836 7th Ave | 1:35 p.m. |
| 6448697 | 9287 Justin Lane | 2:05 p.m. |

FIG. 3

VEHICULAR ROUTE OPTIMIZATION SYSTEM AND METHOD

BACKGROUND OF THE INVENTION

1. Field of the Ivention

The present invention generally relates to vehicular information systems and, in particular, to a system and method for changing an order that a vehicle is to arrive at destinations in response to requests by users for pick-up or delivery of an item or for some other reason, so that the vehicle arrives at the destinations at more opportune times for the users.

2. Related Art

Delivery vehicles often travel predetermined routes in making deliveries and/or pick-ups. For example, a passenger bus is often scheduled to arrive at certain bus stops at predefined times. Passengers who desire to ride the bus meet the bus at one of the stops, when the bus is scheduled to arrive at the stop. If a passenger is unable to meet the bus at the scheduled time, the passenger misses the bus. Therefore, many passengers inconveniently rearrange their schedule so that they can meet the bus at one of the stops.

In another example, package delivery vehicles often carry packages to certain destinations. The route of a package delivery vehicle is often determined based on the packages that are to be delivered by the vehicle while traveling the route. In this regard, each of the packages is scheduled to arrive at a particular destination, and the order that packages are delivered is usually selected to minimize the amount of time and/or distance required for the vehicle to travel its route. However, the selected order is not necessarily convenient for each recipient that is to receive delivery of at least one of the packages. For example, due to the order of delivery selected, the vehicle may be scheduled to deliver one of the packages between 1:00 p.m. and 2:00 p.m. The recipient of this package may not be available to receive delivery during this time period. Therefore, the package is usually either left unattended at the place of delivery or is not delivered. When the package is not delivered, a later delivery attempt (often the next day) is attempted.

It would be desirable for a delivery system to allow the route of the delivery vehicle (including the order that the vehicle arrives at particular destinations) to be selected such that the routes are convenient to the users that are to meet the vehicle for delivery and/or pick-up. However, most delivery systems are associated with a very large number of vehicles and/or users, and the administrative burden of accommodating individual user preferences is costly. Therefore, most delivery systems select delivery vehicle routes without accommodating individual user preferences.

Thus, a heretofore unaddressed need exists in the industry for providing a system and method capable of efficiently accommodating user preferences in selecting the routes for delivery vehicles.

SUMMARY OF THE INVENTION

The present invention overcomes the inadequacies and deficiencies of the prior art as discussed hereinbefore. Generally, the present invention provides a vehicular route optimization system and method for changing an order that a vehicle is to arrive at destinations based on requests by users so that the vehicle arrives at the destinations at more opportune times for the users.

In architecture, the vehicular route optimization system of the present invention utilizes memory, a first communications device, and a data manager. The memory stores data indicating an order that a mobile vehicle is expected to arrive at a plurality of destinations. The first communications device receives a request transmitted from a remote communications device, and the data manager, in response to the request, defines a new order that the mobile vehicle is expected to arrive at the plurality of destinations. The data manager also identifies one of the destinations and a particular time period based on the request and determines whether the vehicle is expected to arrive at the one destination during the particular time period, if the vehicle travels a route based on the new order. If the vehicle is expected to arrive at the one destination during the particular time period when the vehicle travels the route based on the new order, the data manager updates the data such that the data indicates the new order. The updated data can then be displayed to a driver of the vehicle, who follows the route based on the new order. Therefore, the vehicle should arrive at the one destination during the particular time period.

The present invention can also be viewed as providing a vehicular route optimization method. This method can be broadly conceptualized by the following steps: storing data, the data defining an order that a mobile vehicle is expected to arrive at a plurality of destinations; receiving a request for the vehicle to arrive at one of the destinations during a particular time period; analyzing the data in response to the request; determining whether to accept the request based on the analyzing step; modifying the order in response to a determination in the determining step to accept the request; rendering the data; and indicating the modified order via the rendering step.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

FIG. 3 is an illustration of an image produced by an output device in rendering route data depicted in FIG. 2.

DETAILED DESCRIPTION OF THE PREFERRED EMBODIMENT

Figure 1:
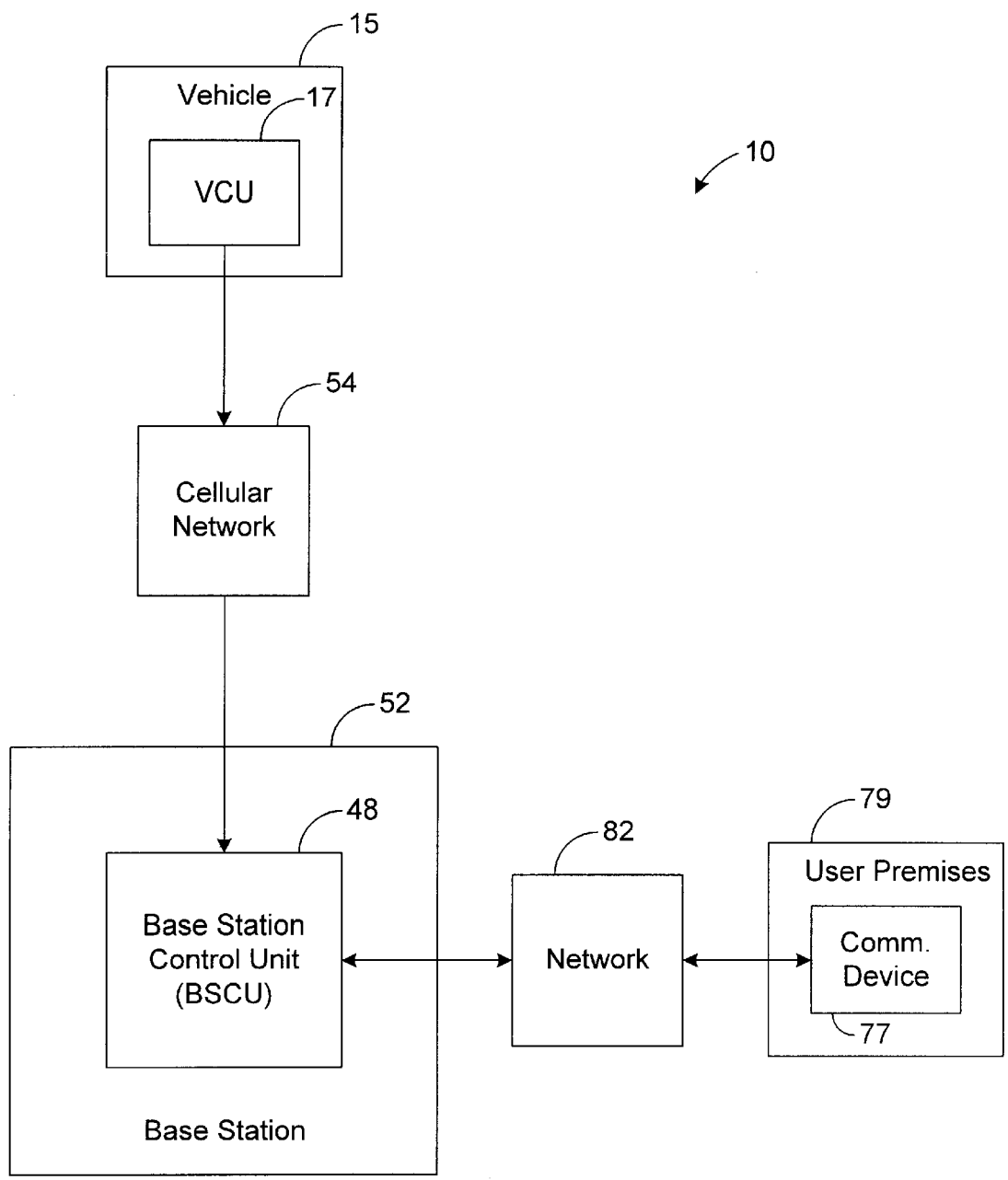
FIG. 1 is a block diagram illustrating a vehicular route optimization system in accordance with the present invention.

FIG. 1 depicts a vehicular route optimization system 10 in accordance with the preferred embodiment of the present invention. The system 10 includes a mobile vehicle 15 that is scheduled to deliver or pick-up items at various locations. In the context of this document, an "item", may be anything to be carried by mobile vehicle 15. For example, an "item", may be, but is not limited to, a package and/or a person to be delivered or picked-up by vehicle 15.

As shown by FIG. 1, the vehicle 15 preferably includes a vehicle control unit (VCU) 17 that is used to control the schedule of the vehicle 17. In this regard, the VCU 17 preferably indicates the route that the vehicle 15 is scheduled to travel, and the driver of the vehicle 15 utilizes the VCU 17 to determine where to drive the vehicle 15 in making deliveries and/or pickups.

Figure 2:
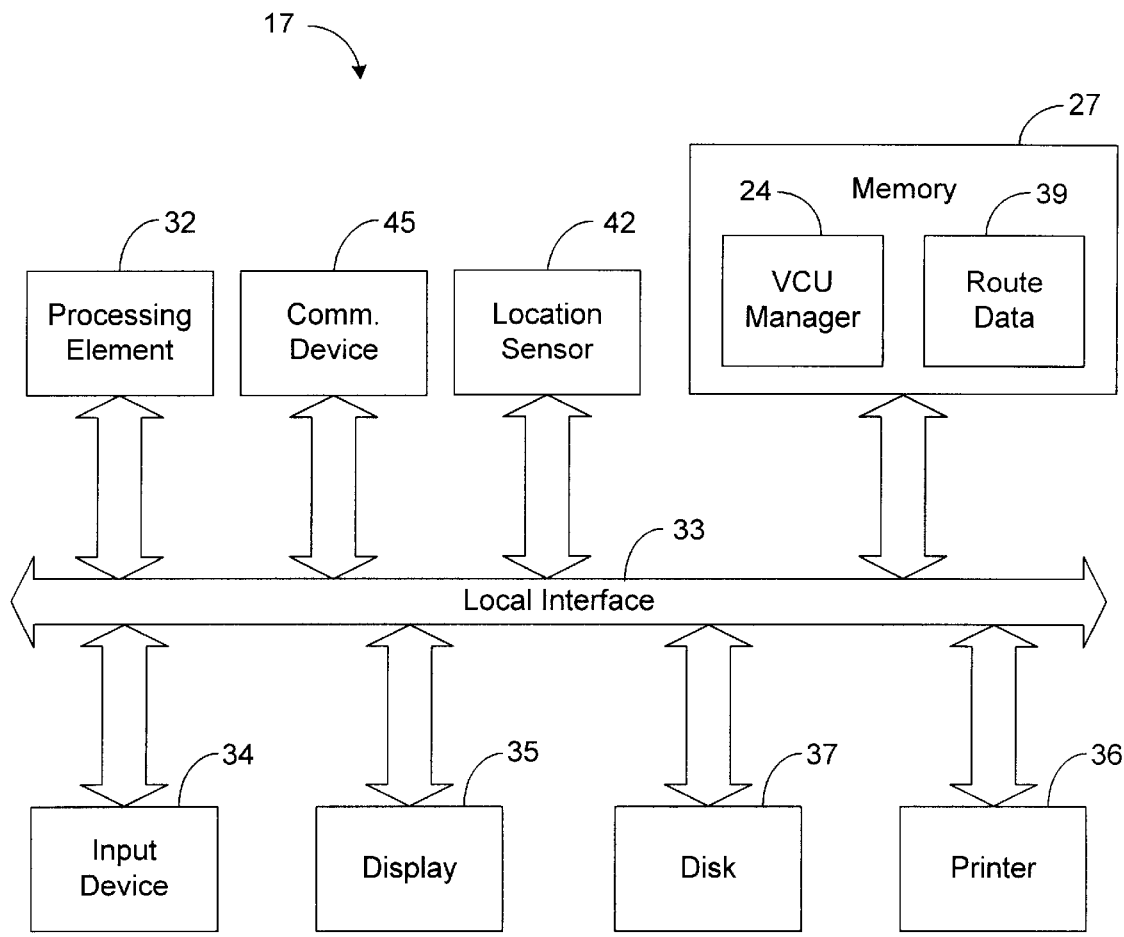
FIG. 2 is a block diagram illustrating a more detailed view of a vehicle control unit (VCU) depicted in FIG. 1.

FIG. 2 depicts a more detailed view of the VCU 17. As shown by FIG. 2, the VCU 17 preferably includes a VCU manager 24 that controls the operation of the VCU 17. The VCU manager 24 can be implemented in software, hardware, or a combination thereof. In the preferred embodiment, as illustrated by way of example in FIG. 2, the VCU manager 24 of the present invention along with its associated methodology is implemented in software and stored in computer memory 27.

Note that the VCU manager 24, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium", can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the VCU manager 24 may be magnetically stored and transported on a conventional portable computer diskette.

The preferred embodiment of the VCU 17 of FIG. 2 comprises one or more conventional processing elements 32, such as a digital signal processor (DSP), that communicate to and drive the other elements within the VCU 17 via a local interface 33, which can include one or more buses. Furthermore, an input device 34, for example, a keyboard or a mouse, can be used to input data from a user of the VCU 17, and screen display 35 or a printer 36 can be used to output data to the user. A disk storage mechanism 37 can be connected to the local interface 33 to transfer data to and from a nonvolatile disk (e.g., magnetic, optical, etc.).

Route data 39 is preferably stored in memory 27. The route data 39 indicates the route that the vehicle 15 is presently scheduled to drive. For example, assume that the vehicle 15 is scheduled to deliver a plurality of items to different locations. The route data 39 may include an entry for each delivery. Each entry includes an item identifier that identifies the item to be delivered and includes location data that identifies the location that the item is to be delivered. The entry may also include data indicating when the item is expected to be delivered. The route data 39 or a portion of the route data 39 may be displayed to the driver via display 35 and/or printer 36.

FIG. 3 depicts an exemplary image 42 produced by the display 35 and/or printer 36 in rendering an exemplary set of route data 39. As shown by FIG. 3, the image 42 depicts a plurality of entries in which each entry defines the following: 1) the item identifier identifying an item to be delivered, 2) the address that the item is to be delivered, and 3) the time (expected time of arrival or ETA) that the item is expected to be delivered or picked-up. Therefore, the driver of vehicle 15 may analyze the image 42 to determine where the next delivery should occur. It should be noted that the route data 39 may include other data and/or other combinations of data without departing to from the principles of the present invention.

Referring to FIG. 2, the route data 39 may be downloaded into memory 27. The order of deliveries may be predetermined (i.e., prior to downloading the route data 39) or may be automatically determined by the VCU manager 24. In this regard, the VCU manager 24 may be configured to analyze the data defining the locations of each of the deliveries and to determine an optimum order of delivery. Then, the VCU manager 24 may be configured to determine the approximate times of delivery based on the distances between deliveries and/or other factors. Some other factors that the VCU manager 24 may take into account are, but are not limited to, expected travel conditions (e.g., congested or non-congested), performance of past deliveries made in the same areas, known delays along the route of travel, etc. To define the order (or other information) of the route data 39, the VCU manager 24 may utilize any type of route management software or services known in the art.

The VCU manager 24 may also monitor the travel of the vehicle 15 as the vehicle 15 is making its deliveries. For example, the driver may enter via input device 34 data indicating the current location of the vehicle 17. Alternatively, such data may be automatically determined via a location sensor 42 (FIG. 2) on board the vehicle 15. Examples of location sensors 42 capable of providing data defining the location of the vehicle 15 are, but are not limited to, GPS, LORAN, TACAN, and/or DECCA sensors.

Based on the location of the vehicle 15, the VCU manager 24 may determine whether or not the vehicle 15 is early and/or late, and/or the VCU manager 24 may determine when the vehicle 15 is within a predetermined time and/or distance from a particular location. Based on this information, the VCU manger 24 may update the route data 39. For example, the VCU manager 24 may update the time that the vehicle 17 is expected to make its deliveries or pick-ups based on the current location of the vehicle 15. In addition, the VCU manager 24 may utilize the aforementioned information to enable users (e.g., recipients of items to be delivered) to be warned when the vehicle 15 is within a predetermined time or distance of a destination and/or when the vehicle 15 is off schedule. U.S. Patent Application entitled "Base Station Apparatus and Method for Monitoring Travel of a Mobile Vehicle,", assigned Ser. No. 09/395,501, and filed on Sep. 14, 1999, and U.S. Patent Application entitled "Advance Notification System and Method Utilizing a Computer Network,", assigned Ser. No. 08/536,908, and filed on Jan. 23, 1996, which are both incorporated herein by reference, describe systems and methods that warn users of impending arrivals of vehicles 15 at particular locations.

Figure 4:
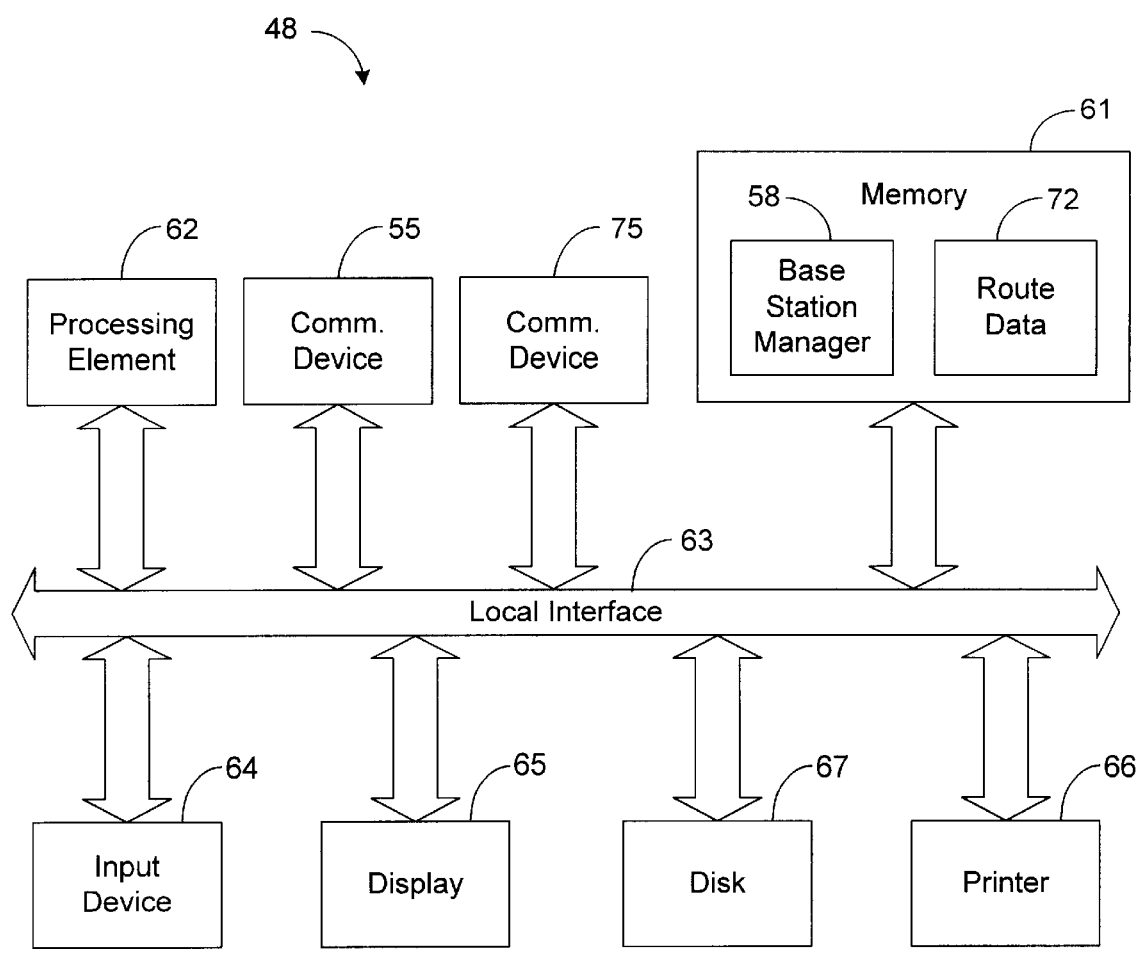
FIG. 4 is a block diagram illustrating an more detailed view of a base station control unit (BSCU) depicted in FIG. 1.

As shown by FIG. 2, the VCU 17 includes a communications device 45 that enables the VCU 17 to communicate with a base station control unit (BSCU) 48 located at a base station 52 (FIG. 1) that is remotely located from the vehicle 15. Due to the mobility of the vehicle 15, it is preferable for the communications device 45 to communicate with the base station 52 via wireless signals. For example, the communications device 45 may communicate cellular signals, which are transmitted through a cellular network 54 (FIG. 1). As depicted by FIG. 4, the BSCU 48 includes a communications device 55 capable of communicating with the communications device 45 of the VCU 17. It should be noted that cellular network 54 is not a necessary feature of the present invention, and the communications devices 45 and 55 may communicate via other networks or may communicate directly.

The BSCU 48 also includes a base station manager 58 that controls the operation of the BSCU 48. The base station manager 58 can be implemented in software, hardware, or a combination thereof. In the preferred embodiment, as illustrated by way of example in FIG. 4, the base station manager 58 of the present invention along with its associated methodology is implemented in software and stored in computer memory 61. Note that the base station manager 58, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. As an example, the base station manager 58 may be magnetically stored and transported on a conventional portable computer diskette.

The preferred embodiment of the BSCU 48 of FIG. 4 comprises one or more conventional processing elements 62, such as a digital signal processor (DSP), that communicate to and drive the other elements within the BSCU 48 via a local interface 63, which can include one or more buses. Furthermore, an input device 64, for example, a keyboard or a mouse, can be used to input data from a user of the BSCU 48, and screen display 65 or a printer 66 can be used to output data to the user. A disk storage mechanism 67 can be connected to the local interface 63 to transfer data to and from a nonvolatile disk (e.g., magnetic, optical, etc.).

Route data 72 is preferably stored in memory 61 of BSCU 48. The route data 72 preferably includes the same information as the data defining the route data 39 (FIG. 2), although it is possible for variances to exist between data 72 and 39. Therefore, the route data 72 can be analyzed to determine which deliveries the vehicle 15 is scheduled to make. However, the route data 72 may include additional data, if desired. For example, the route data 72 may define the schedules of a plurality of vehicles 15 so that the schedule of any vehicle 15 associated with the base station 52 can be determined by analyzing the route data 72. The route data 72 can be downloaded into memory 61 via any suitable techniques. For example, the VCU manager 24 may transmit data from route data 39 to base station manager 58 via communications device 45 and 55. The base station manager 58 may then use this transmitted data to define route data 72. In another example, the route data 72 may be downloaded from an external source.

In an alternative embodiment, the route data 72 may be defined by base station manager 58 or downloaded into memory 61, and the base station manager 58 may transmit data from route data 72 to VCU manager 24 via communications device 45 and 55. The VCU manager 24 may then use this transmitted data to define route data 39.

To keep the information in route data 72 up to date, the VCU manager 24 preferably transmits status messages to the BSCU 48 indicating the vehicle's proximity as the vehicle 15 travels. Based on these status messages, the base station manager 58 is configured to update the route data 72. Therefore, the expected arrival times indicated by the route data 72, similar to the expected arrival times indicated by the route data 39, should be updated as the vehicle 15 travels, making the expected arrival times defined by route data 72 more accurate. If desired, the BSCU 48 may transmit a notification message to users when the vehicle 15 is within a predefined proximity of particular destinations to warn the users of impending arrivals of the vehicle 15. U.S. patent application Ser. Nos. 09/395,501 and 08/536,908 describe in more detail the process of updating route data 72 at a base station 52 and of transmitting notification messages to users.

As shown by FIG. 4, the BSCU 48 preferably includes a communications device 75 capable of communicating with a communications device 77 (FIG. 1) located at a user premises 79, which is remotely located from the base station 52. The communications devices 75 and 77 may utilize any suitable communication techniques to communicate therebetween and may communicate wireless and/or land-based signals. The communications devices 75 and 77 may communicate directly or may communicate via a network 82, as shown by FIG. 1. The network 82 may be any suitable communications network including, but not limited to, the publicly switched telephone network (PSTN), a cellular network, and/or the Internet. In some embodiments, communications devices 55 and 75 may be implemented by a single device capable of communicating with communications devices 45 (FIG. 2) and 77 (FIG. 1).

If desired, a user at user premises 79, may contact the BSCU 48 to determine when a particular item or vehicle 15 is scheduled to arrive at a particular location. For example, the user may establish communication with the BSCU 48 via communications devices 75 and 77 and transmit a request for the time that a particular item or vehicle 15 is expected to arrive at user premises 79 or some other location. To identify the item or vehicle 15, the request may include an item identifier or vehicle identifier, or the user may be prompted by the BSCU 48 for such information.

In response to the user's request, the base station manager 58 is configured to automatically retrieve the requested data from route data 72 and to transmit the requested data to communications device 77, which interfaces the data with the user. Therefore, the user is aware of when the particular item or vehicle 15 is expected to arrive at the user's premises or other location.

In some situations, the time that the item or vehicle 15 is expected to arrive at the premises 79 or other destination is not suitable to the user. For example, the item or vehicle 15 may be expected to arrive at the user's premises 79 around 3:00 p.m., and the user may be scheduled to be at the user's premises 79 only between 12:00 p.m. and 2:00 p.m. In such a situation, the user may request that the expected time for arrival of the item or vehicle 15 be changed. For example, the user may request for the item or vehicle 15 to arrive between 12:00 p.m. and 2:00 p.m. so that the user will be at the premises 79 when the item or vehicle 15 arrives.

In this regard, the user may transmit a request, via communications devices 75 and 77, to change the arrival time. The request preferably includes an identifier that identifies the item or vehicle 15 and includes the requested time or time period that the user would like the vehicle 15 to arrive with the item at the premises 79 or other destination. If necessary, the request indicates the destination of interest to the user. For example, if the request includes an item identifier, then it should not be necessary for the user to specify a destination, since the location of delivery of the item (which is defined by the route data 39 and 72) is the destination of interest to the user. However, if the request includes a vehicle identifier instead, then it may be necessary for the request to indicate the destination of interest to the user.

In response to the user's request, the base station manager 58 is designed to analyze the route data 72 to determine whether or not the request can be accommodated. Any algorithm for determining whether or not the request is acceptable may be used. For example, in the preferred embodiment, the base station manager 58 is configured to rearrange the order of deliveries and to calculate the estimated time that the vehicle 15 should arrive at each of its remaining destinations based on the new order of deliveries. If the new order of deliveries results in the vehicle 15 arriving at the premises 79 or other destination of interest to the user within the requested time period, then the base station manager 58 may accept the user's request. In another embodiment, a human operator may determine whether or not to accept or reject the request and enter such determination into the system 10 via input device 34 (FIG. 2) or 64 (FIG. 4).

If the base station manager 58 accepts the request, then the base station manager 58 is designed to transmit a message to the user via communications devices 75 and 77 notifying the user that the user's request has been accepted. The message preferably indicates the new time that the vehicle 15 is expected to arrive at the premises 79 or other destination of interest.

Upon accepting the user's request, the base station manager 58 is also designed to update the route data 72 for the change in the order of deliveries. Then, the base station manager 58 is designed to transmit a notification message to the VCU 17 indicating the change in the order of deliveries. Based on this notification message, the VCU manager 24 is configured to update the route data 39 so that the order of deliveries (and, therefore, the arrival times) indicated by the route data 39 corresponds with the new order of deliveries determined by the base station manager 58 in accepting the user's request. The VCU manager 24 is then designed to display the updated route s data 39 to the driver of the vehicle 15, and the driver, therefore, should be aware of the change in the order of deliveries. The driver then drives a route such that the deliveries made by the vehicle 15 correspond with the order of deliveries defined by the updated route data 39. As a result, the vehicle 15 should arrive at the premises 79 or other destination of interest within the requested time period (i.e., within 12:00 p.m. and 2:00 p.m. in the example described hereinbefore).

If the new order of deliveries does not result in the expected arrival time of the vehicle 15 at premises 79 or other destination of interest to be within the requested time period, the base station manger 58 is designed to reject the new order of delivery and may then try other order of deliveries. Once each possible order of delivery is rejected by the base station manager 58 or after a desirable number (at least one) of orders of deliveries are rejected, the base station manager 58 is configured to reject the user's request. In this regard, the base station manager 58 transmits a message to the user via communications devices 75 and 77 indicating that the user's request cannot or will not be accommodated. The user may then submit another request to change the time that the vehicle 15 arrives at the premises 79 or other destination of interest to another time period, if desired, and the aforementioned process is repeated. Until a request is accepted, the route data 72 and the route data 39 are not modified in response to any requests submitted by the user, and the vehicle 15 therefore, should arrive at the premises 79 or other destination of interest at the originally schedule time (i.e., 3:00 p.m. in the example described hereinbefore), assuming the vehicle 15 remains on schedule.

It should be noted that the base station manger 58 may consider other factors in deciding whether or not to accept the user's request. For example, the base station manager 58 may consider the effect the new order of deliveries has on the expected arrival times for other deliveries. For example, if the new order of delivery under consideration by the base station manager 58 increases the expected time of arrival of the vehicle 15 for another delivery or pick-up by more than a threshold amount, then the base station manager 58 may be configured to reject the new order of delivery, even though the new order of delivery is otherwise acceptable. Such considerations may be particularly useful when users have been guaranteed that an item or vehicle 15 will arrive at a particular destination at or before a particular time. If the new order of delivery causes the item or vehicle 15 to arrive at the particular destination after the guaranteed time, then the base station manager 58 is preferably configured to reject the new order of delivery.

It should also be noted that the process or any portion of the process of receiving a request from a user and of accepting or rejecting the request can be automatic, requiring no intervention from a human operator. This automatic process may include updating the route data 72 and the route data 39 in response to an acceptance of the request and may include the transmission of a message to the user to indicate whether or not the request has been accepted.

It should be further noted that the base station 52 is not necessary in implementing the present invention. Although the base station 52 provides an efficient means to interface users with a plurality of VCUs 17 on board different vehicles 15, the communications device 77 (FIG. 1) may communicate directly with the communications device 45 (FIG. 2), if desired. In this embodiment, the VCU manager 24 accepts or rejects the request based on the route data 39, similar to the methodology employed by the base station manager 58 in accepting or rejecting the request based on the route data 72 in the preferred embodiment.

In another embodiment, the base station 52 may be used to interface a request transmitted by the user with the appropriate VCU 17. For example, instead of accepting or rejecting a request, the base station manager 58 can be configured to transmit the request to the VCU 17 associated with the item or vehicle 15 identified by the request. The VCU manager 24 then accepts or rejects the request based on the route data 39, similar to the methodology employed by the base station manager 58 in accepting or rejecting the request based on the route data 72 in the preferred embodiment. In transmitting a message to the user indicating whether or not the request is accepted, the VCU 17 may transmit the message via the communications devices 55 and 75 located at the base station 52 or may transmit the message directly to the user communications device 79 via network 54.

Note that in the foregoing embodiment, it is not necessary for the route data 72 to correspond with the route data 39. It is sufficient for the route data 72 to only include sufficient information to enable the base station manager 58 to determine which vehicle 15 (and how to establish communication with the VCU 17 of this vehicle 15) is associated with the request submitted by the user.

Operation

The preferred use and operation of the vehicular route optimization system 10 and associated methodology are described hereafter.

Assume for illustrative purposes that a vehicle 15 is scheduled to deliver an item to user premises 79. In addition, the vehicle 15 is also scheduled to deliver other items to other destinations. The VCU 17 of the vehicle 15 stores route data 39 defining the vehicle's schedule to in memory 27. The route data 39 identifies each item to be delivered and identifies the destination that each item is to be respectively delivered. The route data 39 also identifies the time that each item is expected to be delivered and, therefore, indicates the order that the items are expected to be delivered.

At some point, either before the vehicle 15 begins traveling its route to deliver the items or while the vehicle 15 is traveling its route, a user establishes communication with communications device 75 at the base station 52 via communications device 77, which can be located at the user premises 79 or at another location. The user then submits a request to change the time at which the vehicle 15 is scheduled to arrive at premises 79. The request includes sufficient data to identify the vehicle 15 or the item to be delivered at the premises 79. The request also includes sufficient data to indicate a time period that the user would like the vehicle 15 to arrive at premises.

Figure 5:
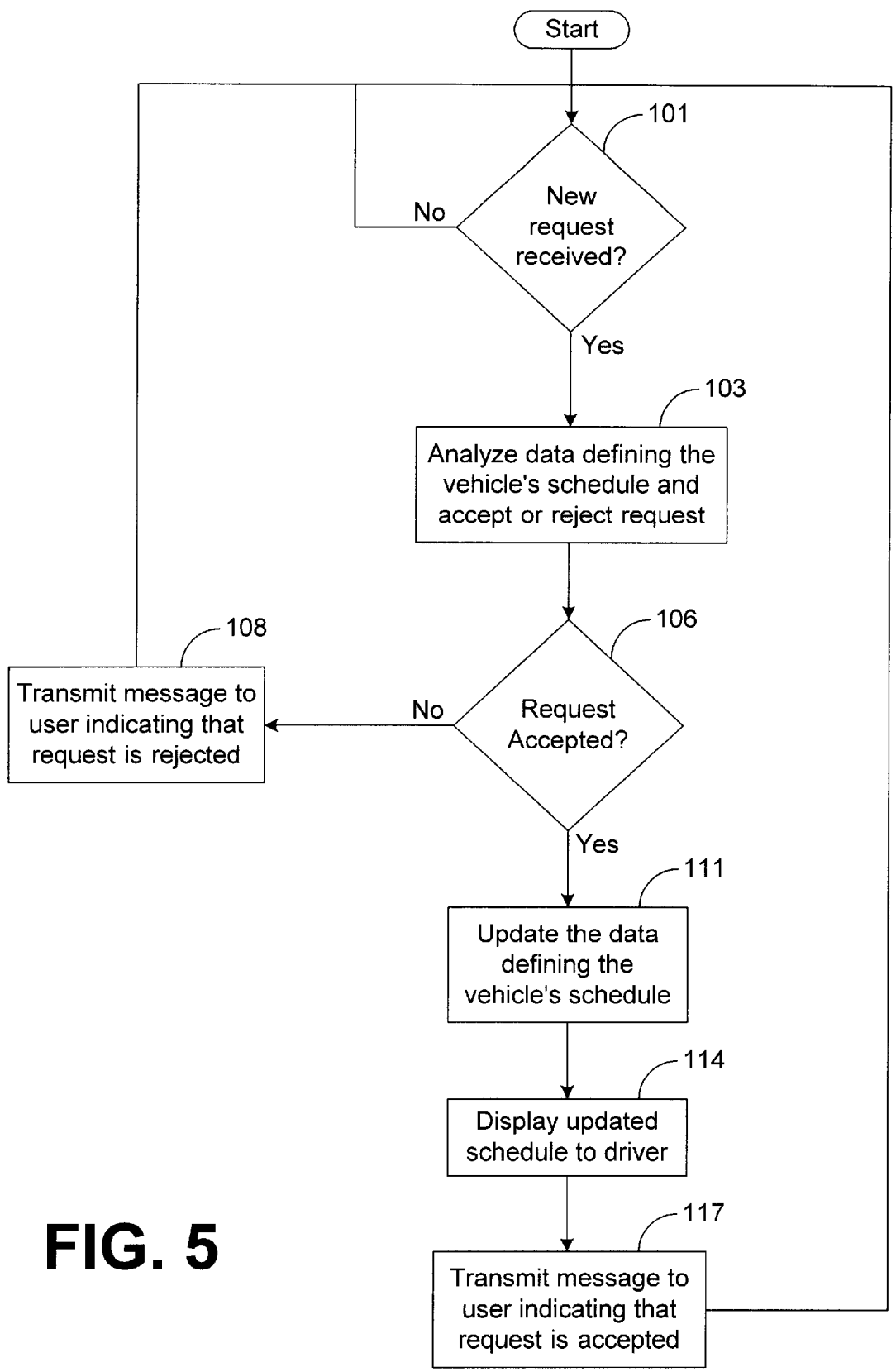
FIG. 5 is a block diagram illustrating the architecture and functionality of a VCU manager and a base station manager depicted in FIG. 2 and FIG. 4, respectively.

As depicted by blocks 101 and 103 of FIG. 5, the BSCU 48 receives the request, and the base station manager 58, in response to the request, analyzes the route data 72 (i.e., the data defining the vehicle's schedule) to determine whether or not to accept the request. There are a variety of methodologies that may be employed to determine whether or not the request is to be accepted.

In the preferred embodiment, the request is accepted if the order of deliveries can be changed such that the vehicle 15 is scheduled to arrive at the premises 79 within the requested time period without causing the other arrival times for other destinations to exceed certain thresholds. For example, the base station manager 58 may define a new order of delivery for the remaining destinations (i.e., the destinations defined by route data 39 and/or 72 that have yet to be reached by the vehicle 15) and to determine the expected arrival times for each of the remaining destinations based on the new order of delivery. If the new order of delivery fails to change the vehicle's arrival time at the premises 79 such that the expected arrival time is within the requested time period, then the base station manager 58 rejects the new order of delivery. Furthermore, the base station manager 58 also rejects the new order of delivery if the new order of delivery causes the expected arrival time for at least one of the destinations to increase above a threshold amount (e.g., one hour) or to exceed a particular time period (e.g., to exceed 1:00 p.m.). Otherwise, the base station manager 58 accepts the new order of delivery.

Different orders of deliveries can be tested until an order is found to be acceptable, until each possible order is tested, or until a desired number of orders is tested. If none of the tested order of deliveries is acceptable, the base station manager rejects the user's request and transmits a message to the user indicating that the request is rejected, as depicted by blocks 106 and 108. If a new order of deliveries is found that is determined by the base station manager 58 to be acceptable, then the base station manager 58 accepts the user's request and changes the vehicle's schedule such that the vehicle's schedule is based on the new order of deliveries, as depicted by block 111.

In this regard, the base station manager 58 updates the route data 72 such that the route data 72 indicates that the vehicle 15 is expected to deliver the items according to the new order of delivery accepted by the base station manger 58. Therefore, the times that the vehicle 15 is expected to arrive at each of the destinations is changed, if necessary, to accommodate for the new order of deliveries. Next, the base station manager 58 transmits a message to VCU 17 indicating the new order of deliveries. The VCU manager 24, in response to this message, updates the route data 39 similar to how the base station manager 58 updated the route data 72. Therefore, the route data 39 should indicate the times that the vehicle 15 is expected to arrive at each of the destinations, assuming that the vehicle 15 travels the route defined by the new order of deliveries previously accepted by the base station manager 58. Then, the updated route data 39 defining the new vehicle schedule is displayed to the driver, as depicted by block 114, and the driver alters the route driven to correspond with the new route data 39. In other words, the driver drives the vehicle 15 to the destinations in the order indicated by the new route data 39. As a result, the vehicle 15 should arrive at the premises 79 during the time period requested by the user, assuming the vehicle 15 experiences no significant delays.

Once the vehicle's schedule has been updated for the new order of the deliveries accepted by the base station manager 58, the base station manager 58 transmits a message to the user via communications devices 75 and 77 indicating that the user's request has been accepted. The message preferably indicates the expected time period that the vehicle 15 is now expected to arrive at the premises 79. Therefore, the user should be aware of the approximate time period that the vehicle 15 should arrive at the premises 79 in following the new order of delivery accepted by the base station manager 58.

As stated hereinbefore, it is not necessary for the base station manager 58 to determine whether or not to accept the user's request. The VCU manager 24 may perform this functionality instead. Therefore, although the base station manager 58 performs the functionality depicted by blocks 101, 103, 106, 108, 111, and 117 in the preferred embodiment, it is possible for the VCU manager 24 to perform the functionality of these blocks in other embodiments.

It should be emphasized that the above-described embodiments of the present invention, particularly, any "preferred", embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the claims.

Now, therefore, the following is claimed:

1. A vehicular route optimization system, comprising:
   memory storing data, said data indicating an order that a mobile vehicle is expected to arrive at a plurality of destinations;

a first communications device configured to communicate with a remote communications device; and a data manager interfaced with said first communications device, said data manager configured to automatically analyze said data in response to a request received by said first communications device and transmitted from said remote communications device, said data manager further configured to automatically determine whether to accept said request based on said data and to update said data, in response to a determination by said data manager to accept said request, such that said data indicates a new order that said mobile vehicle is expected to arrive at said plurality of destinations.

2. The system of claim 1, wherein said data manager is configured to identify one of said destinations and a first time period based on said request, said data manager further configured to accept said request in response to a determination that said vehicle is expected to arrive at said one destination during said first time period when said vehicle follows a route based on said new order.

3. The system of claim 1, wherein said data manager is configured to identify one of said destinations and a first time period based on said request, said data manager further configured to reject said request in response to a determination that said vehicle is expected to arrive at said one destination outside of said first time period when said vehicle follows a route based on a new order of arrival of said vehicle at said plurality of destinations.

4. The system of claim 1, wherein said data manager is further configured to determine a proximity of said vehicle and to accept said request based on said proximity of said vehicle.

5. The system of claim 1, wherein said remote communications device is located at one of said destinations.

6. The system of claim 1, wherein said data manager and said first communications device are coupled to said vehicle.

7. The system of claim 6, further comprising a base station manager configured to select said vehicle based on said request and to transmit said request to said first communications device via said remote communications device.

8. The system of claim 1, wherein said data manager is located at a base station remotely located from said vehicle, said data manager further configured to transmit, via a communications device at said base station, data indicating said new order to said vehicle when said data manager determines to accept said request.

9. The system of claim 8, further comprising a vehicle data manager coupled to said vehicle, said vehicle data manager configured to receive said data indicating said new order and to display a vehicle schedule based on said data indicating said new order.

10. The system of claim 1, wherein said data indicates when said mobile vehicle is scheduled to arrive at said plurality of destinations, and wherein said request indicates a new time that said mobile vehicle is to arrive at one of said destinations.

11. The system of claim 10, wherein said data manager, in determining whether to accept said request, is configured to determine whether said vehicle is scheduled, based on said new order, to arrive at said one destination substantially at said new time and whether said vehicle is scheduled, based on said new order, to arrive at another of said destinations during a specified time period.

12. The system of claim 10, wherein said request includes an item identifier, said item identifier indicating to said data manager an item of interest to a user.

13. The system of claim 10, wherein said request includes a vehicle identifier, said vehicle identifier indicating to said data manager said mobile vehicle on which an item of interest to a user is disposed.

14. The system of claim 13, wherein said request further includes a destination identifier, said destination identifier indicating to said data manager said one destination.

15. A vehicular route optimization system, comprising:

memory storing data, said data indicating an order that a mobile vehicle is expected to arrive at a plurality of destinations;

a first communications device configured to receive a request transmitted from a remote communications device; and a data manager interfaced with said first communications device, said data manager configured to automatically define, in response to said request, a new order that said mobile vehicle is expected to arrive at said plurality of destinations, said data manager further configured to identify one of said destinations and a particular time period based on said request and to determine whether said vehicle is expected to arrive at said one destination during said particular time period if said vehicle travels a route based on said new order, said data manager further configured to automatically accept said request and update said data, in response to a determination that said vehicle is expected to arrive at said one destination during said particular time period if said vehicle travels said route based on said new order, such that said data indicates said new order.

16. The system of claim 15, wherein said data manager is further configured to determine a proximity of said vehicle and to determine whether said vehicle is expected to arrive at said one destination during said particular time period based on said proximity of said vehicle.

17. The system of claim 15, further comprising a base station manager configured to select said vehicle and to transmit said request to said first communications device via said remote communications device.

18. The system of claim 15, wherein said data manager is located at a base station remotely located from said vehicle, said data manager further configured to transmit, via a communications device at said base station, data indicating said new order to said vehicle.

19. The system of claim 18, further comprising a vehicle data manager coupled to said e vehicle, said vehicle data manager configured to receive said data indicating said new order and to display a vehicle schedule based on said data indicating said new order.

20. The system of claim 15, wherein said data indicates when said mobile vehicle is scheduled to arrive at said plurality of destinations, and wherein said request indicates a new time that said mobile vehicle is to arrive at said one destination.

21. The system of claim 20, wherein said data manager, in determining whether to accept said request, is configured to determine whether said vehicle is scheduled, based on said new order, to arrive at said one destination substantially at said new time and whether said vehicle is scheduled, based on said new order, to arrive at another of said destinations during a second specified time period.

22. A vehicular route optimization method, comprising the steps of storing data, said data defining an order that a mobile vehicle is expected to arrive at a plurality of destinations;

receiving a request for said vehicle to arrive at one of said destinations during a particular time period;

analyzing said data in response to said request;

automatically determining whether to accept said request based on said analyzing step;

automatically modifying said order in response to a determination in said determining step to accept said request;

rendering said data; and indicating said modified order via said rendering step.

23. The method of claim 22, wherein said determining step further includes the steps of determining whether said vehicle is expected to arrive at said one destination during said particular time period if said vehicle follows said modified order.

24. The method of claim 22, wherein said determining step further includes the steps of:

determining a proximity of said vehicle; and determining, based on said proximity, whether said vehicle is expected to arrive at said one destination during said particular time period if said vehicle follows said modified order.

25. The method of claim 22, further comprising the steps of:

selecting said vehicle based on said request; and transmitting said request to said vehicle based on said selecting step.

26. The method of claim 25, wherein said selecting step includes the step of selecting said vehicle based on a vehicle identifier contained in said request.

27. The method of claim 18, wherein said selecting step includes the step of selecting said vehicle based on an item identifier contained in said request, said item identifier identifying an item of interest to a user.

28. The method of claim 22, further comprising the steps of:

transmitting said data from a base station to said vehicle subsequent to said modifying step; and performing said rendering and indicating steps at said vehicle.

29. The method of claim 22, wherein said data indicates when said mobile vehicle is scheduled to arrive at said plurality of destinations, and wherein said determining step further includes the step of determining whether said vehicle is scheduled, based on said modified order, to arrive at another of said destinations during a second specified time period.

30. The method of claim 22, wherein said request contains a destination identifier, said destination identifier identifying said one destination.

performing said rendering and indicating steps at said vehicle.

31. A vehicular route optimization method, comprising the steps of:

storing data, said data defining an order that a mobile vehicle is expected to arrive at a plurality of destinations;

receiving a request for a vehicle to arrive at one of said destinations during a particular time period;

automatically defining, in response to said request, a new order that said mobile vehicle is expected to arrive at said plurality of destinations;

automatically determining whether said vehicle is expected to arrive at said one destination during said particular time period if said vehicle travels a route based on said new order;

automatically updating said data such that said data indicates said new order that said mobile vehicle is expected to arrive at said plurality of destinations;

performing said updating step in response to a determination in said determining step that said mobile vehicle is expected to arrive at said one destination during said particular time period if said vehicle travels said route based on said new order; and rendering said updated data.

32. The method of claim 31, further comprising the steps of:

monitoring said vehicle as said vehicle travels;

determining a current location of said vehicle based on said monitoring step; and determining whether to accept said request based on said current location of said vehicle.

33. The method of claim 31, further comprising the steps of: selecting said vehicle based on said request; and transmitting said request to said vehicle based on said selecting step.

34. The method of claim 33, wherein said selecting step includes the step of selecting said vehicle based on a vehicle identifier contained in said request.

35. The method of claim 33, wherein said selecting step includes the step of selecting said vehicle based on an item identifier contained in said request, said item identifier identifying an item of interest to a user.

36. The method of claim 31, further comprising the steps of:

transmitting said data from a base station to said vehicle in response to said updating step; and performing said rendering step at said vehicle.

37. The method of claim 31, wherein said data indicates when said mobile vehicle is scheduled to arrive at said plurality of destinations, and wherein said determining step further includes the step of determining whether said vehicle is scheduled, based on said new order, to arrive at another of said destinations during a second specified time period.

38. The method of claim 20, wherein said request contains a destination identifier, said destination identifier identifying said one destination.

* * * * *